July 2, 1968  E. I. VALYI  3,390,431
APPARATUS FOR MOLDING ARTICLES
Original Filed Sept. 10, 1963  2 Sheets-Sheet 2
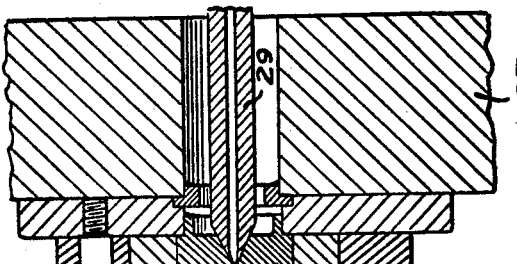
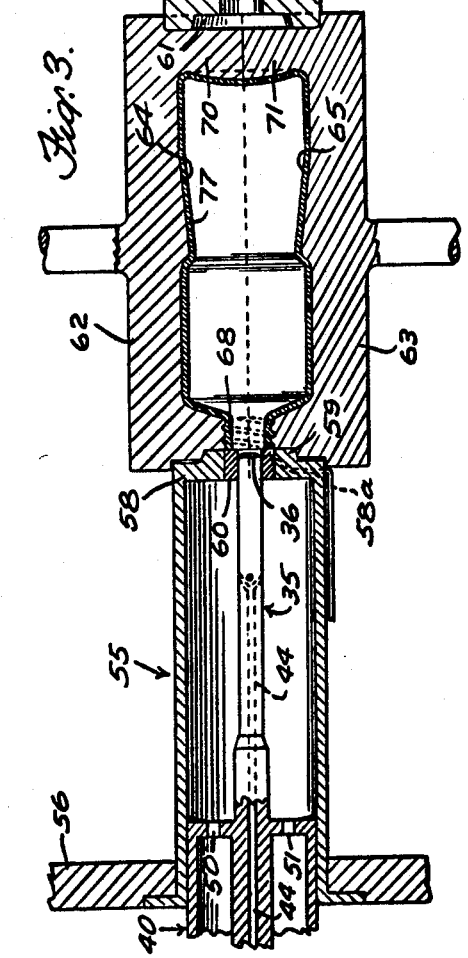
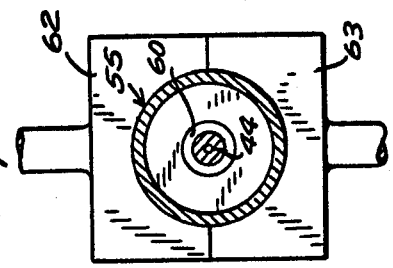
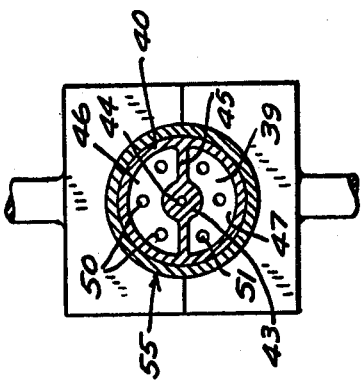
INVENTOR.
EMERY I. Valyi
BY
ATTORNEY

United States Patent Office 3,390,431
Patented July 2, 1968

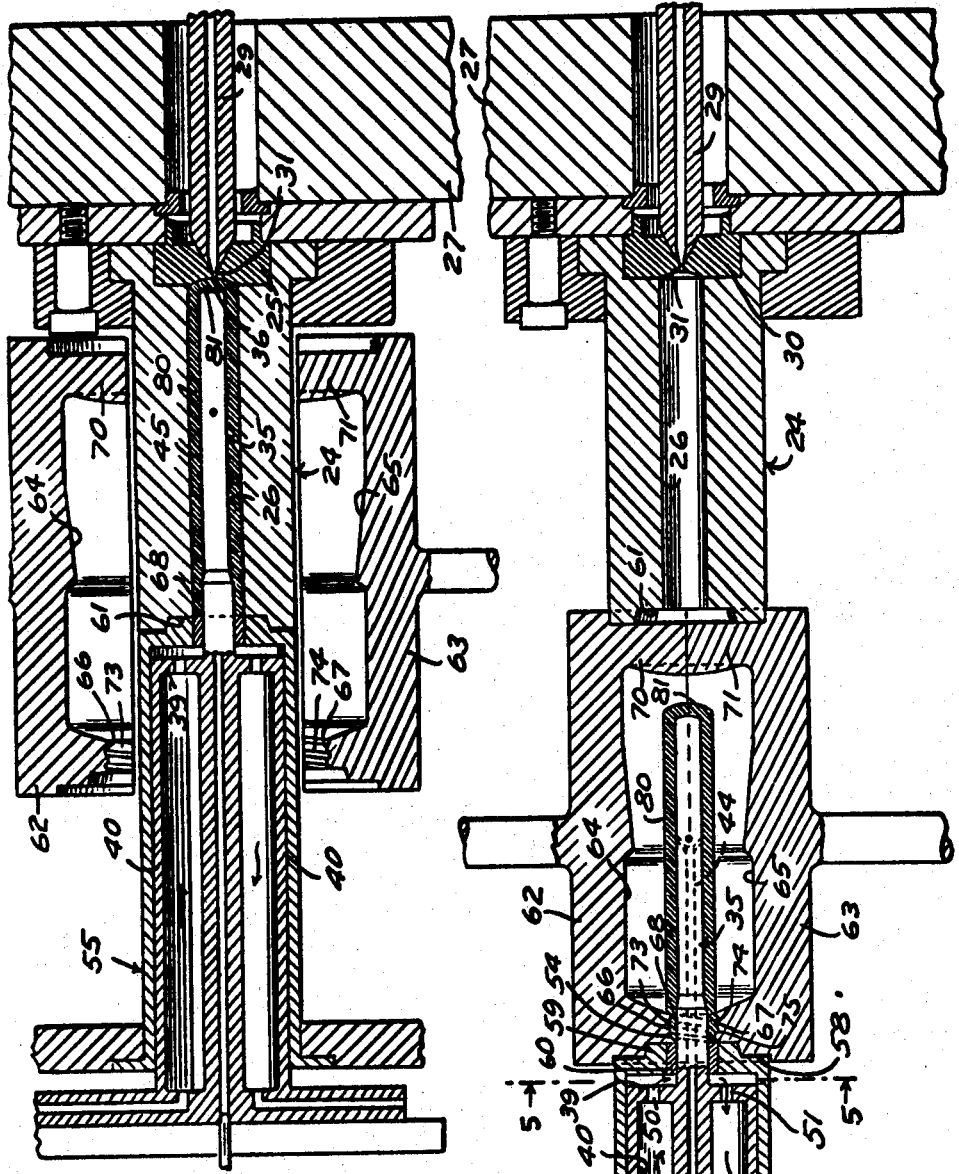

3,390,431
APPARATUS FOR MOLDING ARTICLES
Emery I. Valyi, Riverdale, N.Y. 10471
Original application Sept. 10, 1963, Ser. No. 308,020, now Patent No. 3,330,894, dated July 11, 1967. Divided and this application Apr. 14, 1967, Ser. No. 630,971
3 Claims. (Cl. 18—5)

ABSTRACT OF THE DISCLOSURE

A blow molding apparatus wherein a blown article is formed from a parison carried on a blow core including a blow mold into which the blow core is inserted with the parison thereon for blowing into the shape of the finished article. The blow mold carries a seal for the blow core through which the blow core can be withdrawn from the blown article in the blow mold without breaking the seal. After the blow core has been so withdrawn, fluid pressure is introduced through the seal for maintaining the blown article under pressure while still in the blow mold.

This application is a division of my co-pending application Ser. No. 308,020 filed Sept. 10, 1963 and now Patent No. 3,330,894.

This invention relates to apparatus for molding articles of organic plastic material and more particularly to a method and apparatus for molding wherein a parison is first formed in a parison die and is then blown into the final form in a blow mold.

Apparatus of this general type is shown in my U.S. Patent No. 3,029,468 dated Apr. 17, 1962. This patent shows a separable blow mold shaped to form the final article and through which a blow core forming the inner walls of a parison die extends. An injection nozzle aligned with outer members of the parison die is disposed in the injection zone outside of the blow mold cavity. The arrangement is such that the parison is formed with the blow core extending entirely through the open blow mold and into the injection zone. The blow core with the parison thereon is then retracted from the injection zone into the blow mold cavity after which the blow mold is closed and the parison expanded by fluid pressure into its final form.

Other apparatus designed to produce blown hollow articles from parisons that were molded around a blow core are well known in the art as for example U.S. Patent No. 2,872,700.

In molding operations of the above type it is necessary to control the temperature of the blow core which becomes heated by contact with the hot plastic material. This has necessitated forming the blow core, over a substantial portion of its length with channels for the circulation of the cooling fluid. The blow core must also be equipped with a conduit for blow air. In a long, slender blow core it is difficult to maintain sufficient mechanical rigidity while at the same time providing adequate fluid passages for the above purposes. Also, due to the lack of accessibility, difficulty is encountered in applying a parting agent to the surface of the blow core to prevent the parison from adhering thereto.

An object is to provide a cycle of operation wherein the blow core is removed from the blown article substantially immediately after blowing and wherein the hollow article is maintained under pressure in the blow mold after the removal of the blow core.

Various other objects and advantages will be apparent as the nature of the invention is more fully disclosed.

The invention will be better understood from the following description taken in connection with the accompanying drawings in which a specific embodiment has been set for the purposes of illustration.

In the drawings:

FIG. 1 is a longitudinal section with parts in elevation showing a mold and die embodying the invention;

FIG. 2 is a similar section showing the blow mold in closed position with the parison in place before blowing;

FIG. 3 is a similar section showing the blow core fully retracted into the cooling chamber; and FIGS. 4 and 5 are transverse sections taken on the lines 4—4 and 5—5 respectively of FIG. 2.

Referring to the drawings more in detail the invention is shown as including a cover die 24 having a bottom wall 25 and a cylindrical wall 26 forming the outer wall of the parison die. Cover die 24 may of course be parted axially or radially and may be formed of several components movable in relation to each other to facilitate removal of the parison to be described. The cover die 24 is mounted on a fixed support 27. An injection nozzle 29 is aligned with and pressed against orifice 31 in the wall 25.

A blow core 35 having an end wall 36 and a cylindrical wall 37 is adapted to form the inner surface of the parison. The blow core has an enlarged cylindrical portion 38 adapted to form the neck of the parison and is carried by an end wall 39 of a cylindrical member 40.

The cylindrical member 40 is carried by a forward end wall 41 attached to a slide plate 42. An air conduit 43 extends through the walls 39 and 41 to supply air to blow-air passage 44 of the core 35. A diametrical wall 45 divides the cylinder 40 into chambers 46 and 47. Cooling fluid is supplied to the chambers 46 and 47 by radial inlet and outlet passages 48 and 49 in the wall 41. Wall 39 is provided with passages 50 and 51 for the purpose to be described.

A sleeve 55 attached to a slide plate 56 is disposed around the cylindrical member 40 and is formed with an end wall 58 having an enlarged hub portion 59 carrying an expanding seal 60 which makes a fluid tight seal with the blow core 35. The hub 59 and seal ring 60 seat within a recess 61 in the cylindrical wall 26 of the cover die 24 to form an end closure for the parison die. The seal ring 60 may be of th expanding diaphragm type adapted to maintain a liquid tight seal with the blow core as the latter is reciprocated during the molding operation.

The blow mold comprises a pair of halves 62 and 63 which are adapted to be separated or closed by suitable means, not shown. Parts 62 and 63 have recesses 64 and 65 which together form the cavity for the bottle or the like to be blown therein and have semi-cylindrical surfaces 66 and 67 which are adapted to clamp the neck 68 of the parison when the blow mold parts are closed. The surfaces 66 and 67 are shown as formed with thread forming recesses 73 and 74 which are adapted to form raised threads 75 on the neck 68 of the formed bottle 77. The parts 62 and 63 have registering bottom forming members 70 and 71 which are adapted to close the bottom of the blow mold cavity.

In operation with the blow mold parts 62 and 63 in separated position as shown in FIG. 1 the blow core 35 is positioned within the wall 26 of the cover die 24 and with its inner end 36 spaced from the end wall 25 to form the cylindrical side wall 80 and dished bottom wall 81 of the parison. The hub 59 and sealing ring 60 are disposed within the recess 61 in the cover die 24 to form a closure for the parison die. With the parts in this position the parison is injected through the nozzle 29 and orifice 31.

After the parison has been thus formed the blow core 35 with the parison thereon and the sleeve 55 are retracted axially as a unit to withdraw the parison from the cover die 24 into alignment with the blow mold parts 62 and 63 and the blow mold is closed about the parison as shown in FIG. 2. Air is then admitted through the passage 44 of the blow core 35 for expanding the parison into the recesses 64 and 65 of the blow mold to form the bottle 77. The surfaces 66 and 67 of the blow mold clamp the neck 68 of the parison and shape the corresponding bottle neck, as shown in FIG. 3.

After the bottle has been blown the blow core is retracted axially from the bottle and blow mold into the sleeve 55 with its surface in contact with the liquid which is circulated through the chambers 46 and 47 and through passages 50 and 51 to the space formed between the blow core and the sleeve 55.

The seal ring 60 maintains a tight seal with the surface of the blow core to prevent escape of the coolant. The coolant may contain or comprise a parting agent to apply a film of parting material to the blow core for facilitating the blowing of the parison. The blow mold halves are then opened, the bottle removed and the cycle repeated.

As an alternate to retracting blow core 35 only partially into sleeve 55, as shown in FIG. 3, the blow core may be fully withdrawn into the sleeve and the opening closed by the expanding seal 60 alone, or by a separate closure member, not shown. Pressure should be maintained within the blown bottle after blow core 35 is retracted therefrom and while the bottle is cooling in the blow mold and provision is made for the introduction of air for this purpose other than through the blow core, such as through passage 58a in the end plate 58, as indicated by dotted lines in FIG. 3.

The fluid contained in sleeve 55 may be a vapor or mist-like dispersion of a parting agent or a gas. For example, water or oil may be used and also steam or air, and the parting agent may be chosen from a variety of commercial compositions of the silicone family, or the like.

It will be noted that the fluid serves to control the temperature of the blow core between parison injections and eliminates the necessity for cooling ducts or passages within the blow core itself.

What is claimed is:

1. Apparatus for forming hollow articles of organic plastic material comprising a parison die including a blow core having side and end walls adapted to form the inner surfaces of the corresponding walls of the parison and having a fluid passage for the supply of fluid for expanding the parison into a blow mold, an outer die member having a bottom wall and side walls adapted to form the outer surfaces of the corresponding parison walls and registering with said blow core to form a closed parison die, and a blow mold, means retracting said blow core with the formed parison thereon from said parison die and introducing the same into said blow mold, means blowing said parison in said blow mold to form said hollow object, means retracting said blow core from said hollow object in said blow mold and means maintaining said hollow object under fluid pressure while in said blow mold after the retraction of said blow core.

2. Apparatus for forming hollow articles of organic plastic material comprising a parison die including a blow core, a blow mold, means retracting said blow core with the formed parison thereon from said parison die and introducing the same into said blow mold, means blowing said parison in said blow mold to form said hollow article, means retracting said blow core from said hollow article in said blow mold and means maintaining said hollow article under fluid pressure while in said blow mold after the retraction of said blow core.

3. Apparatus for making a parison of organic plastic material comprising an outer die member having a cylindrical wall and an end wall adapted to form the outer surfaces of the parison wall and a blow core having an end wall and a cylindrical wall shaped to form the inner surface of the parison wall and adapted to form, with the outer die member, a closed parison die, injection means for injecting the plastic material through the end wall of said outer die member, a retractable sleeve having an end wall, said end wall having an opening through which said blow core extends and carrying an expanding seal engaging the surface of said blow core to form a fluid tight seal therewith, said seal engaging the end surface of said outer die member to form an end closure for the parison die, means retracting the sleeve and blow core axially from said outer die member with the parison in place on said blow core for exposing the parison for blowing, a blow mold having a cavity into which the parison is blown to form a hollow object, means introducing the blow core with the parison thereon into said blow mold with said seal engaging said blow mold to seal the blow mold cavity, means blowing the parison into conformity with said cavity, means retracting said blow core entirely out of the blown object while maintaining said seal and means supplying fluid pressure through said seal for maintaining said hollow object under pressure while in said blow mold after the retraction of said blow core therefrom.

References Cited

UNITED STATES PATENTS

| | | | |
|---|---|---|---|
| 2,262,612 | 11/1941 | Kopitke | 18—5 X |
| 3,002,225 | 10/1961 | Goller | 18—5 |
| 3,244,778 | 4/1966 | Ninneman | 264—97 X |

FOREIGN PATENTS 1,106,868 12/1955 France.

WILBUR L. McBAY, *Primary Examiner.*